United States Patent
Ogawa et al.

(10) Patent No.: US 6,632,023 B1
(45) Date of Patent: Oct. 14, 2003

(54) OPTICAL MODULE CONNECTOR ADAPTOR

(75) Inventors: Shinji Ogawa, Yokohama (JP); Hidetoshi Ishida, Yokohama (JP); Toshiaki Kakii, Yokohama (JP); Atsushi Takai, Yokohama (JP); Atsushi Miura, Yokohama (JP); Hiroaki Furuichi, Yokohama (JP)

(73) Assignees: Sumitomo Electric Industries, Ltd., Osaka (JP); Hitachi, Ltd., Tokyo (JP)

( * ) Notice: Subject to any disclaimer, the term of this patent is extended or adjusted under 35 U.S.C. 154(b) by 0 days.

(21) Appl. No.: 09/762,094
(22) PCT Filed: Aug. 4, 1999
(86) PCT No.: PCT/JP99/04213
§ 371 (c)(1),
(2), (4) Date: May 16, 2001
(87) PCT Pub. No.: WO00/08503
PCT Pub. Date: Feb. 17, 2000

(30) Foreign Application Priority Data

Aug. 4, 1998 (JP) .......................... P10-220370

(51) Int. Cl.[7] .............. G02B 6/36; H01R 13/58
(52) U.S. Cl. ........................... 385/53; 439/453
(58) Field of Search .................. 385/53, 58, 60, 385/65, 66, 69; 439/453

(56) References Cited

U.S. PATENT DOCUMENTS 4,406,514 A * 9/1983 Hillegonds et al. ........... 385/88
5,214,731 A * 5/1993 Chang et al. ................ 385/69
6,222,967 B1 * 4/2001 Amano et al. ............... 385/49

FOREIGN PATENT DOCUMENTS

| JP | 59-157605 | 9/1984 |
| JP | 60-80402 | 6/1985 |
| JP | 58-172927 | 6/1985 |
| JP | 4-73562 | 11/1992 |
| JP | 6-289236 | 10/1994 |
| JP | 9-243864 | 9/1997 |
| JP | 9-258063 | 10/1997 |
| JP | 10-104466 | 4/1998 |
| JP | 10-339826 | 12/1998 |
| JP | 11-84174 | 3/1999 |

* cited by examiner

*Primary Examiner*—Chandrika Prasad
(74) *Attorney, Agent, or Firm*—McDermott, Will & Emery

(57) ABSTRACT

An adapter 5 for an optical connector comprises a pair of wall portions 55a and 55b on a mounting surface 56a. The structure allows the adapter to accommodate an optical connector 4 inserted from a direction vertical to the mounting surface 56a, and allows the adapter to accommodate an optical connector 7 inserted along a predetermined axis 8. On this account, it is possible to insert the connector 7 along the predetermined axis 8 to the housed optical connector 4. Since the optical connector 4 is mated to and demated from the optical connector 7 in this sort of adapters, force applied to an optical module 2 is decreased in mating/demating the connector. An optical module product 9 includes the optical module 2, a coated optical fiber 3, the optical connector 4, and the optical connector's adapter 5. An optical module mounting substrate product 1 includes the optical module product 9 and a substrate 10 for mounting thereon the optical module 2 and the adapter 5 for optical connectors.

19 Claims, 11 Drawing Sheets

OPTICAL MODULE CONNECTOR ADAPTOR

TECHNICAL FIELD

The present invention relates to an adapter for accommodating an optical connector, an optical module product including an optical connector, an adapter for the optical connector and an optical module, and an optical module mounting substrate product including the optical module product mounted onto a substrate.

BACKGROUND ART

A receptacle type optical module is known as an optical module. The optical module makes conversion such as opto-electric conversion, i.e., O/E conversion, or electro-optic conversion, i.e., E/O conversion. For the conversion, an optical fiber is optically connected to the optical module so as to receive and provide optical signals. This connection is made through a detachable/attachable connector.

DISCLOSURE OF THE INVENTION

As results of study on optical module products each including the optical module, the present inventors have found following problems. Are ceptacle type optical module includes a connector portion therein. An optical connector is directly mated to and unmated from this connector portion while connecting an end of an optical fiber. Thus, in the receptacle type optical module, external forces may be directly applied to the optical module itself when the optical connector is attached thereto or detached therefrom. The present inventors have found that the external forces may damage components in the optical module.

It is, therefore, an object of the present invention to provide an adapter, allowing external forces applied to an optical module to decrease when an optical connector is mated thereto or demated therefrom with a coated optical fiber connected to the optical connector, for an optical module connector, an optical module product including an optical module connector, and an optical module mounting substrate product on which the optical module product is mounted.

The adapter for an optical connector according to the present invention comprises a bottom portion and first and second wall portions. The bottom portion has a mounting surface that extends along a predetermined axis, and the mounting surface is provided so as to mount first and second optical connectors thereon. The first and second wall portions have respective inner wall surfaces thereof, each extending along a predetermined axis. The first and second wall portions are provided on the mounting surface such that one inner wall surface faces the other.

Preferably, the adapter for an optical connector can be applied to an optical module product comprising an optical module, a coated optical fiber, and a first optical connector. One end of the coated optical fiber is connected to this optical module. The other end of the coated optical fiber is connected to the first optical connector.

The adapter has a structure, providing the wall portions on the mounting surface, that makes it possible to accommodate the first optical connector provided along the direction vertical to the mounting surface and to accommodate the second optical connector provided along the predetermined axis. Thus, the second connector can be inserted in the predetermined axis direction to the accommodated first optical connector. The first optical connector is connected to the optical module through the coated optical fiber. Since the second optical connector is mated to and demated from this first optical connector, the external forces applied to the optical module, is decreased in mating and demating.

The bottom portion and the first and second wall portions are arranged to provide first and second opening portions. The first opening portion is opened in the direction vertical to the mounting surface so as to receive the first optical connector therefrom, and the second opening portion is opened in the predetermined axial direction so as to receive the second optical connector therefrom.

Since the adapter has a structure having the first opening portion and the second opening portion, the first connector can be inserted through the first opening portion of the adapter onto the mounting surface and then can be accommodated on the mounting surface while it is guided by both inner wall. The second connector is inserted through the second opening portion and then is introduced along both inner walls and the mounting surface of the adapter. Since the second connector is inserted while being guided by the adapter, the second connector can be mated to the first optical connector without damaging the coated optical fiber connected to the accommodated first optical connector.

The adapter further comprises a stopper. The stopper is provided so as to restrict a range where the first optical connector can move in the predetermined axial direction.

The stopper of the adapter defines a range within which the first optical connector can be disposed with respect to the predetermined axial direction. Specifically, even if the first optical connector is pushed by the second optical connector when the second optical connector is inserted along the predetermined axis to the adapter, the stopper restricts the movement range of the first optical connector. For example, since the stopper defines a limit point to which the first optical connector can move, the stopper can suppress a so-called ferrule back phenomenon of an optical connector. Since the stopper can reduce the force applied to the coated optical fiber by the moving first optical connector, the stress that may be applied to the coated optical fiber can be decreased. Further, it is ensured that the second connector is mated to the first optical connector.

In the adapter for an optical connector according to the present invention, the stopper can be provided such that the position of the stopper can be adjusted with respect to the predetermined axis direction. If the position of the stopper is adjusted, the adapter can be applied to various types of optical connectors. The position of the attached stopper can be adjusted in accordance with the configurations of the first and second optical connectors. Further, the adapter for an optical connector according to the present invention can be provided with at least one of a recess and a protrusion provided so as to adjust the position of the stopper with respect to the predetermined axial direction. The recess and protrusion above can be provided on each of the inner wall surfaces of the first and second wall portions. The recess and protrusion above also provide a simple structure, which enables the recess and/or the protrusion to engage with the stopper, that can restrict the movement of the optical connector. This simple structure results in the adapter having high reliability. Furthermore, when the recess and/or protrusion are employed, the stopper can be positioned with high precision in accordance with the positions of the recess and protrusion.

The adapter for an optical connector according to the present invention further comprises a third wall portion, extending in a direction intersecting with the predetermined axis, which is in contact with the first and second wall portions and the bottom portion.

The third wall portion functions as a stopper to the optical first connector. The third wall portion can include a cut portion. This cut portion is provided so as to introduce and guide the coated optical fiber connected to the first optical connector.

The adapter for an optical connector according to the present invention further comprises a lid, supported by the first and second wall portions, which can be provided so as to face the mounting surface. This lid can be provided so as to cover the first opening portion.

This lid, together with the mounting surface, can define the position of the optical connector with respect to the direction vertical to the mounting surface. On this account, it is possible to decrease bending of the optical fiber that may be caused by movement, in the adapter, of the connected or non-connected optical connector. The lid can protect the optical connectors arranged in the adapter, for example, the lid can prevent the optical connectors from directly contact with parts disposed around the optical connectors, and can provide dust-tight adapter. The lid can protect the optical connector against heat in a step of reflow soldering in manufacturing a optical module product.

In the adapter for an optical connector according to the present invention, the bottom portion has a latch portion. The latch portion is provided so as to extend opposite to the direction, with respect to the mounting surface, in which the first and second wall portions extend. The bottom portion may also include one or more latch portions. The latch portion facilitates the attachment of the adapter to the substrate.

Further, the adapter for an optical connector according to the present invention may have one or more additional features as described below.

In the adapter for an optical connector of the present invention, the lid may include a plurality of leg portions extending from the opposite sides of the lid. Each of the plurality of leg portions can include a projection engaging with the bottom portion of the adapter. Each of the first and second wall portions can include, on the respective outer surfaces of the wall portions, guide grooves for guiding the plurality of leg portions of the lid. This lid can have an inner wall surface provided so as to face the mounting surface. This inner wall surface can include a protruding portion so as to position the first and second connectors with respect to the direction vertical to the mounting surface. The inner wall surface can also include a guide portion for guiding the second connector with respect to its insertion direction. Further, the bottom portion has a plurality of latch portions, extending along an axis perpendicular to the mounting surface, on a bottom surface opposed to the mounting surface. Each of the plurality of latch portions includes a projection provided so as to be latched in a substrate to be attached.

An optical module product of the present invention comprises an optical module, an adapter for an optical connector, an optical fiber and a first optical connector. The optical module makes conversion in at least one of the following directions: the conversion from electric signals to optical signals; and the conversion from optical signals to electric signals. The optical connector is accommodated in the adapter. The optical fiber has a first end portion connected to the optical module and a second end portion connected to the optical connector. The optical module product according to the present invention has one of the adapter's configurations that has already been described above and will be described below.

According to the optical module product, the adapter can hold the optical connector attached to one end of the optical fiber, the other end of which is connected with the optical module. The adapter can reduce the magnitudes of forces, such as bending forces, applied to the optical fiber.

For example, since the first optical connector can be provided on the mounting surface of the adapter in the direction vertical to the mounting surface through the first opening portion, the forces applied to the optical fiber can be reduced. Since the second optical connector is inserted through the second opening portion along the predetermined axis, i.e., in a direction of the optical axis of the first optical connector, to mate the first connector, these optical connectors can be easily mated to each other.

In the optical module product according to the present invention, the optical fiber can include a coating layer. The coating layer protects the optical fiber against forces that act thereon when the optical fiber contacts with peripheral components or the like. The coating layer can also protect the optical fiber against heat in a reflow soldering step of optical module product manufacture. Since the coating layer provides rigidity in the optical fiber, the amount of the optical fiber bending can be decreased even if forces is exerted on the optical fiber.

In the optical module product of the present invention, the coated layer may include a heat-shrinkable tubing adhered to the side surface of the optical fiber. The heat-shrinkable tube is easily adhered to the optical fiber to form the adhered coating layer. The heat-shrinkable tubing can also protect the coated optical fiber against heat added in the reflow soldering step because of the excellent heat resistance of the heat-shrinkable tubing. If the heat-shrinkable tubing is also provided around a portion of the optical fiber where bending is apt to occur, such as the connection portion of the optical fiber connected with the optical connector or optical module, the bending of the optical fiber can be decreased.

An optical module mounting substrate product according to the present invention comprises one or more optical module products and a substrate. The substrate has a conductive wiring layer. An optical module and an adapter are mounted on the substrate. The optical fiber has a first end portion connected to the optical module and a second end portion connected to an optical connector. The optical connector is accommodated in the adapter. The adapter may has one of the configurations that has already been described above and will be described below.

Since the second optical connector is mated to and unmated from the first connector that is accommodated in the adapter with the optical module connected to one end of the first connector, the accommodation prevents force from being directly exerted to the optical module in the mating and unmating it. This arrangement can decrease variation in characteristics of the optical module caused by the force exerted there to in mating the connectors. This allows the optical module to keep excellent characteristics for a long term.

The adapter receives the optical connector provided in the direction vertical to its mounting surface. This configuration makes it possible to shorten the length of the optical fiber to the same degree as the distance between the adapter and the optical module on the substrate while connecting the optical module with the optical connector. It is possible to reduce the length of the optical fiber necessary for arranging the optical connector in the adapter. Thus, the optical fiber does not have a surplus length that becomes unnecessary after the connectors are mated with each other. Since the optical fiber has no surplus length, this saves an area on the substrate required for placing the optical fiber tied together.

In the optical module mounting substrate product according to the present invention, an interval between the optical module and the adapter can be not less than 10 mm and not more than 40 mm. This distance is suitable for increasing the mounting density of the substrate.

In the optical module mounting substrate product according to the present invention, the optical module, the optical connector, the optical fiber and the adapter for the optical connector can be provided along the optical axis of the optical module product.

The optical module mounting substrate product according to the present invention includes 16 optical module products. Each of the optical module products is provided so as to face one side of the substrate.

BEST MODE FOR CARRYING OUT THE INVENTION

Figure 1:
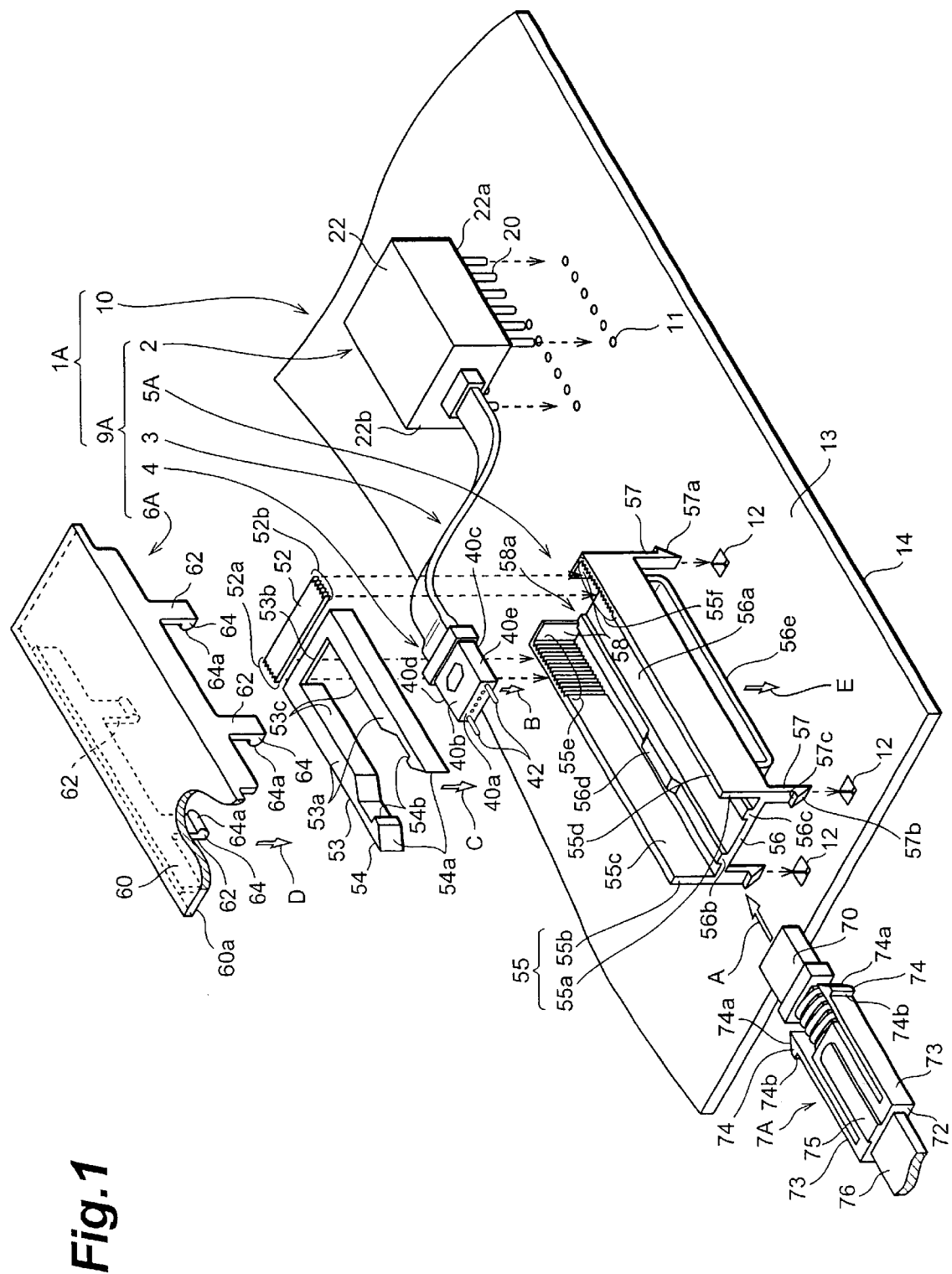
FIG. 1 is a perspective view showing an optical module product, an optical module mounting substrate product, and optical connectors according to a first embodiment.

Hereinafter, embodiments of the present invention will be described with reference to the drawings. The same or like portions are designated by the same reference numerals to omit the repeated explanation.

A first embodiment of an optical module member of the present invention will be described with reference to FIGS. 1 to 5.

Figure 2:
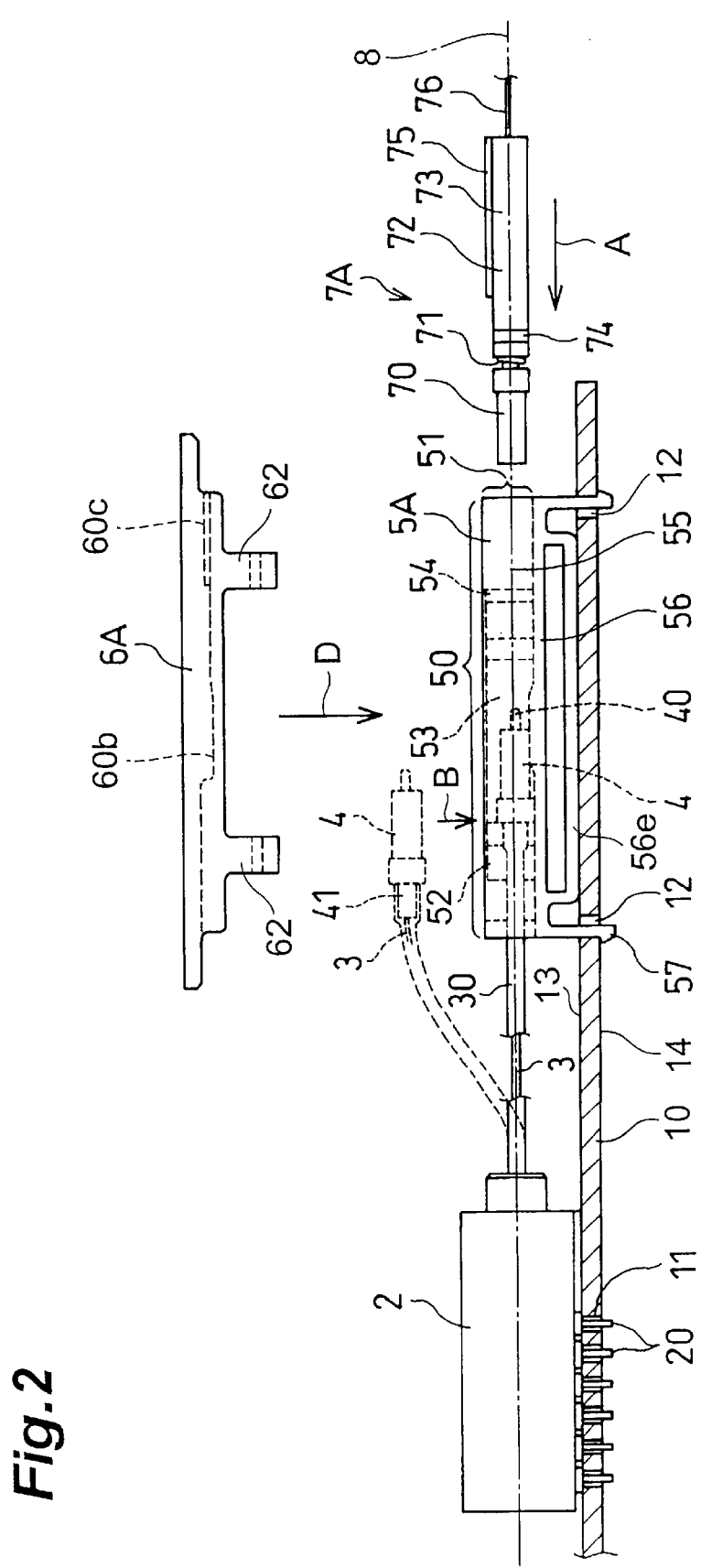
FIG. 2 is a side view showing the optical module product, the optical module mounting substrate product, and the optical connectors according to the present embodiment.
Figure 3:
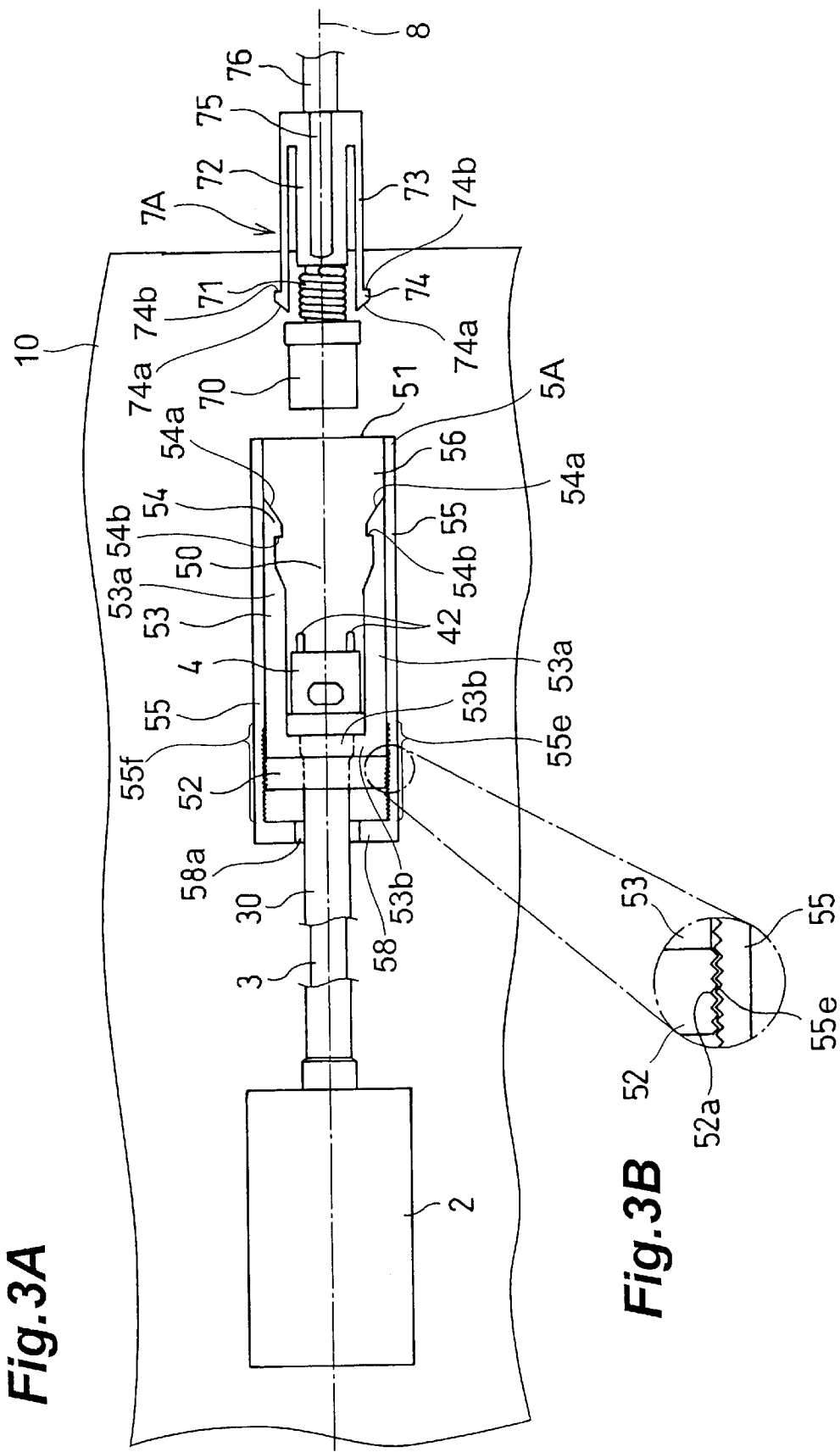
FIG. 3A is a plan view showing the optical module product including an optical connector adapter in which the optical connector is accommodated, the optical module mounting substrate product, and another optical connector.
FIG. 3B is a view showing a positioning portion.

With reference to FIG. 1 and FIG. 2, an optical module mounting substrate of this embodiment is shown. An optical module mounting substrate product 1A of this embodiment comprises an optical module product 9A and an optical module mounting substrate (hereinafter referred to as a substrate) 10. The optical module product 9A comprises an optical module 2, an coated optical fiber 3, an optical connector 4, and an adapter for the optical connector (hereinafter referred to as an adapter) 5A. The adapter 5A can include a cover 6A. The optical module 2 and the adapter 5A, included in the optical module product 9A, are mounted on the substrate 10. These drawings also show another optical connector 7A to be mated to the optical connector 4.

A printed circuit board can be used as the substrate 10. The printed circuit board comprises an optical module mounting surface 13, a rear surface 14, and a wiring layer such as printed wiring, between these surfaces. Other electronic parts are also mounted on this substrate 10, and the electronic parts are electrically connected to each other through the printed wiring. The optical module 2 is also electrically connected to these electronic parts.

The substrate 10 has a plurality of through holes 11 for attaching the optical module 2, and a plurality of mounting holes 12 for attaching the adapter 5A. Terminals 20 of the optical module 2 are soldered to the substrate 10 with the terminals 20 inserted in the through holes 11. When the terminals 20 are soldered to the holes 11, the optical module 2 is electrically connected to the printed wiring of the substrate 10. Electrical signals are entered to and provided from the optical module 2 through the through holes 11.

The optical module 2 makes at least one of the following conversion: conversion from optical signal to electrical signal; and conversion from electrical signal to optical signal. For the conversion, the optical module 2 includes at least one of a light receiving device, such as a semiconductor light receiving element, and a light emitting device, such as a semiconductor light emitting element. As the semiconductor light receiving element, a photodiode is used, and as the semiconductor light emitting element, a semiconductor laser and a light emitting diode are used. This optical device is optically coupled to an optical fiber included in the coated optical fiber 3.

The optical module 2 has a molding resin 22 provided so as to mold the optical device. A bottom surface 22a of the molding resin 22 is provided with the terminals 20. The molded optical device can convert electrical signals, entered through the terminals 20, into optical signals to provide the converted signals to the coated optical fiber 3. The molded optical device can also convert optical signals, entered through the coated optical fiber 3, to electrical signals to provide the converted signals to the pins 20. The optical module 2 is not limited to the pin type optical module shown in this embodiment, and other types of optical modules, such as a flat package type optical module, is also used as the optical module 2.

The coated optical fiber 3 is taken out of an end surface 22b of the molding resin 22 in the optical module. In this embodiment, a multi filament multi-filament tape fiber is adopted as the coated optical fiber 3. The coated optical fiber 3 has one end connected to the optical module 2 and the other end attached to the optical connector 4.

The coated optical fiber 3 is covered with a coating layer 30 such as a heat-shrinkable tubing on the side surface thereof. The coating layer 30 is adhered to the side surface of the optical fiber 3. After the coated optical fiber 3 is inserted in the heat-shrinkable tubing 30, heat is added to the heat-shrinkable tubing 30 to contract the heat-shrinkable tubing 30. Then, the heated tube 30 is adhered to the side surface of the optical fiber 3 to form a protecting layer. The coating layer 30 prevents the optical fiber from directly contacting components disposed around the coated optical fiber 3, and protects the coated optical fiber 3 against the a tradiated directly thereto. The heat-shrinkable tubing 30 is adhered to the side surface of the optical fiber to provide rigidity to the coated optical fiber 3, whereby the coated optical fiber 3 can not easily bent. The protecting layer 30 can also coat a connection portion of the optical fiber 3 connected with the optical connector 4 and a connection portion of the optical fiber 3 connected with the optical module 2, respectively. Specifically, one end of the heat shrinkable tubing 30 is attached so as to cover a boot 41 of the optical connector 4 as well. Thus, the protecting layer prevents the coated optical fiber 3 from bending at the connection portion between the optical connector 4 and the optical fiber 3 that is apt to be bent easily.

The optical connector 4 as shown in FIGS. 1 to 5 is an MT type connector. The optical connector 4 is used in combination with the optical connector 7A to be connected thereto. In this embodiment, the connectors 4 and 7A are provided so as to be used as push-on type optical connectors.

One or more filaments of the coated optical fiber are arranged and are fixed in the optical connector 4. The coating resin is removed at an end portion of the coated optical fiber 3 so as to expose the side surfaces of the coated optical fibers. The end faces of the optical fibers are positioned at an end surface 40a of the optical connector 4. The end surface 40a is opposed to the end portion of the optical connector 4 which the optical fiber 3 reaches. A pair of guide pins 42 protrude from the end surface 40a of the optical connector 4 to position it with respect to the other optical connector 7A. The pair of guide pins 42 are directed toward the optical axis direction of the optical fiber arranged in the optical connector 4. Respective guide pins 42 are provided to form separate members from a ferrule covering the optical fiber, and can be made of, for example, metal. However, the optical connector is not limited thereto. The optical connector 4 has an upper surface 40b, a bottom surface 40c, and a pair of side surfaces 40d and 40e, each provided along the optical axis direction. The adapter 5A has a bottom portion 56 extending along a predetermined axis The bottom portion 56 can be a plate-like support extending in one direction. The bottom portion 56 has a mounting surface 56a provided so as to mount the optical connectors 4 and 7A thereon. The bottom portion 56 also has, on the mounting surface 56, a pair of protrusions 56b and 56c extending in the longitudinal direction of the adapter. The protrusions 56b and 56c support not only the bottom surface 40c of the optical connector 4 but also the bottom surface of the optical connector 7A. To support them, the pair of protrusions 56b and 56c extend from one end to the other end of the bottom portion 56. Each protrusion has a shape provided so as to fit the optical connectors 4 and 7A, and can include a recess and a protrusion such as a protruding portion 56d. Since the optical connectors 4 and 7A are accommodated in the adapter 5A while supported on the protrusions 56b and 56c so as to provide space between the mounting surface 56a and the bottom surface 40e of the optical connector. This gap can decrease heat transferred from the substrate 10 to the optical connectors 4 and 7A. That is, the gap works as a heat insulating layer.

A pair of wall portions 55 (55a, 55b) extend along a predetermined axis on the mounting surface 56a of the bottom portion 56. The pair of wall portions 55a and 55b are provided so as to face their inner wall surfaces 55c and 55d with each other. The housed optical connectors 4 and 7A are arranged between the inner wall surfaces 55c and 55d. For example, the optical connector 4 is guided by the pair of side surfaces 40d and 40e when it is accommodated. The pair of wall portions 55 determine the direction of the optical axis of the optical fiber in the pair of optical connectors 4 and 7A to be connected.

The adapter 5A may has a third wall 58 on the mounting surface 56a. The wall portion 58 is arranged at one end of the bottom portion 56. The first to three sides of the wall portion 58 reach the bottom portion 56 and the pair of wall portions 55, respectively. The wall portion 58 has a notched portion 58a. The notched portion 58a is provided so as to form a recess cut from the fourth side of the wall portion 58 toward the mounting surface 56a, and in this embodiment, it reaches the mounting surface 56a. The optical fiber 3, connected to the connector 4, enters through this cut 58a. The optical fiber 3, entering through the cut portion 58a, is introduced unforcibly to the optical connector 4 mounted on the mounting surface 56a.

The adapter 5A is formed of a resin exhibiting heat resistance, such as PPS (polyphenylene sulfide). The adapter 5A resists, for example, a temperature at which it is exposed in a soldering step.

The depth of the cut 58a is determined with respect to the bottom portion 56 such that the optical fiber 3 is arranged almost parallel with the substrate 10 when the optical connector 4 is mounted in the adapter 5A with the optical module 2 and the adapter 5A mounted on the substrate 10. Besides, protrusions consisting of portions 56b, 56c and 56d are provided on the mounting surface 56a of the bottom portion 56 so as to be fitted with the shapes of the optical connectors 4 and 7, so that the optical axis direction of the mounted optical connectors 4 and 7A becomes almost parallel with the substrate 10.

The first and second wall portions 55a and 55b and the bottom portion 56 of the adapter 5A are provided so as to define an accommodation for the optical connectors 4 and 7A. A first opening portion 50 is provided between the pair of wall portions 55a and 55b of the adapter 5A so as to be opened in the direction vertical to the mounting surface 56a. The optical connector can be received through the adapter 5A. Besides, a second opening portion 51 is provided between the pair of wall portions 55a and 55b of the adapter 5A. The second opening portion 51 is opened in a direction in which a predetermined axis 8 (shown in FIG. 2) extends. The second opening portion 51 is provided on one of the opposite side edges of the adapter 5A and the other side edge faces the optical module 2. The adapter 5A can receive the optical connector 7A through this opening portion 51. The optical connector 4 can be, therefore, introduced through the first opening portion 50 so as to be accommodated in the adapter, and then the optical connector 7A can be inserted through the second opening portion 51 toward the optical connector 4. This insertion direction is the same as the optical axis direction of the held optical connector 4.

The adapter 5A has a plurality of latch portions 57 extending in the direction opposite to the wall portion 55 with respect to the mounting surface 56a. With reference to FIGS. 1 and 2, the respective latch portions project at four corners of the bottom portion 56. Respective protrusions 57a are provided at one end of the latch portions 57. Each of the protrusions 57a has a taper surface 57b and a latch surface 57c. The taper surface 57b is provided to come in contact with the mounting hole 12 in which the latch portion 57 is to be inserted when the adaptor is mounted on the substrate. The latch surface 57c is provided to face the rear surface 14 of the substrate 10 after the latch portion 57 has been inserted in the mounting hole 12.

The adapter 5A can be moved in the direction of Arrow E shown in FIG. 1 while the latch portions 57 of the adapter 5A are positioned in the mounting holes 12. The adapter 5A is pushed to the substrate 10, so that the taper surface 57b comes in contact with the edge of the mounting hole 12. The substrate 10 exerts the respective latch portions 57, so that the latch portions are bent inward. When the taper surface 57b overcomes the mounting hole 12 of the substrate 1, the latch portions 57 return to the respective original shapes, so that the latch portion 57 is engaged in the mounting hole 12. In this arrangement, the latch surface 57c faces the rear surface 14 of the substrate 10. When the latch portions 57 of the adapter 5A are latched, the adapter 5A is mounted on the substrate 10.

In the adapter 5A, the bottom portion 56 has a supporting portion 56e provided on the rear surface opposite to the mounting surface 56a on which the wall portions 55a and 55b are provided. The supporting portion 56e is arranged between the substrate 10 and the bottom portion 56. The support member 56e includes a supporting plate that extends around one end of the adapter 5A, then extends along the bottom portion 56 in the longitudinal direction, and then reaches the bottom portion 56 around the other end thereof. The supporting portion 56e has a-predetermined height so that a space is provided between the substrate 10 and the bottom portion 56. This space is provided so as to decrease thermal conduction from the substrate 10 to the adapter 5A.

The adapter 5A includes a guide member 53. The guide member 53 has a pair of arm portions 53a extending in a predetermined direction, and a bridge portion 53b extending in a direction intersecting with the predetermined direction An end of each arm portions 53a includes an engaging portion 54 protruding inward. The adapter 5A also has a stopper 52, which is secured thereto with the stopper 52 positioned in the adapter 5A. When the guide member 53 reaches the stopper 52, it cannot move over the stopper 52. That is, the stopper 52 defines a range in which the guide member 53 can move in the direction in which the optical fiber 3 extends.

The stopper 52 is provided between the pair of wall portions 55. The respective inner surfaces 55c and 55d of the wall portions 55 have means for positioning the stopper 52 thereon.

The adapter 5A has positioning portions 55e and 55f including at least one of protrusions and recesses on the inner surfaces 55c and 55d.

FIG. 3A is a view showing the optical module product 9A and the optical module mounting substrate product 1A. FIG. 3B is an magnified view of the stopper 52 provided in a positioning portion 57. The positioning portions 55e and 55f may include, for example, protrusions 55e and 55f provided at predetermined intervals, and may include the recesses 55e and 55f arranged periodically.

The stopper 52 has engaging portions 52a and 52b, on both ends thereof, engaged in the positioning portions 55e and 55f provided on the inner surfaces 55c and 55d. Each of the engaging portions 52a and 52b has a shape corresponding to the protrusions and/or recesses of the positioning portions 55e and 55f. For example, each of the engaging portions 52a and 52b may include a shape corresponding to the protrusions 55e and 55f provided at predetermined intervals, and may include a shape corresponding to the recess portions 55e and 55f arranged periodically.

A range in which the positioning portions 55e and 55f should be arranged is determined so as to correspond to the range in which the optical connector 4 should be positioned. The stopper 52 is secured at a position associated with that of the optical connector 4. The following procedure shows securing steps. The stopper 52 is positioned at a position, within the positioning portions 55e and 55f, corresponding to the position at which the optical connector 4 should be. The stopper 52 is pushed toward the mounting surface 55a along the positioning portions 55e and 55f. After this pushing, the stopper 52 is has positioned with respect to the direction of the optical axis of the optical connector 4. Since the stopper 52 is movable in the direction vertical to the mounting surface 55a, the stopper 52 can be pulled out in this direction. The position of the stopper 52 can be easily adjusted with respect to the optical axis direction by changing the position of the engagement between the engaging portions 52a and 52b and the positioning portions 55e and 55f. The guide member 53 is arranged while coming in contact with the positioned stopper 52.

The guide member 53 has the engagement projection 54 provide done a charm portion 53a. The engagement projection 54 is engaged in an engagement portion 74 of the optical connector 7A, so that the optical connector 7A is mated with the optical connector 4. To this end, the engagement protrusion 54 has a taper surface 54a and a latch surface 54b. When the optical connector 7A is pushed in to the direction of Arrow A (shown in FIG. 1), the taper surface 54a is brought into contact with a taper surface 74a of the engagement portion 74. The gradual pushing causes the engagement portion 74 to bend inward. When the taper surface 74a of the optical connector 7A surmounts the engagement projection 54, the taper surface 74a releases the engagement projection 54, so that the respective engagement portions 74 return to their respective original shapes. As a result, the engagement portion 74 has been engaged in the guide projection 54. In this configuration, the latch surface 54b of the engagement member 53 faces the latch surface 74b of the optical connector 7A. When the engagement portion 74 of the optical connector 7A is latched by the engagement projection 54 of the engagement member 53, the optical connector 7A is secured to the guide member 53.

The bridge portion 53b connects the pair of arm portions 53a The bridge portion 53b connects the arm portions 53a of the guide member 53 such that the optical connector 4 is provided between the side surfaces 40d and 40e of the arm portions 53a. Since the inner surfaces 53c of the respective arm portions 53a face with each other, both the inner surfaces 53c can guide the optical connector 4. Since the optical fiber 3, connected to the optical Connector 4, is ages arranged between the bridge portion 53b and stopper 52, and the mounting surface 56a in cooperation with, the positional range of the optical fiber 3 is restricted with respect to the direction vertical normal to the mounting surface 56a.

Referring to FIG. 1 and FIG. 2 again, the adapter 5A comprises a cover 6A provided so as to cover the first opening portion 50 therewith. The cover 6A has a lid portion 60, shaped like a plate, having a size to close the whole first opening portion 50. The lid portion 60 can shield heat added to the optical connector 4 through the first opening portion 50. The cover 6A also has a plurality of leg portions 62. The plurality of leg portions 62 are provided at the opposite side edges of the lid portion 60 so as to extend in a direction intersecting with an inner surface 60a of the lid portion 60, so that the cover 6A can be attached to the bottom portion 56 of the adapter 5A. Each of the leg portions 62 has an engagement portion 64. The engagement portion 64 includes a protrusion on the leg portion 62. In an example shown in FIG. 1, a taper surface 64a forming the protrusion provides a protruding shape. Since the cover 6A has the engagement portions 62, the engagement portions 64 are latched to the bottom portion of the adapter 5A when the cover 6A is attached to the adapter 5A. The lid 6A is held so as to cover the opening portion 50. It is preferable that the cover 6A is also formed of a heat-resistant resin, desirably the same material as the adapter 5A. Other engagement portion set forth in this application may have the same as shape of the engagement portion 64 of the leg portion 62, and the engagement portion 64 thereof may have a shape of the same as that of another engagement portion described in this application.

Figure 5:
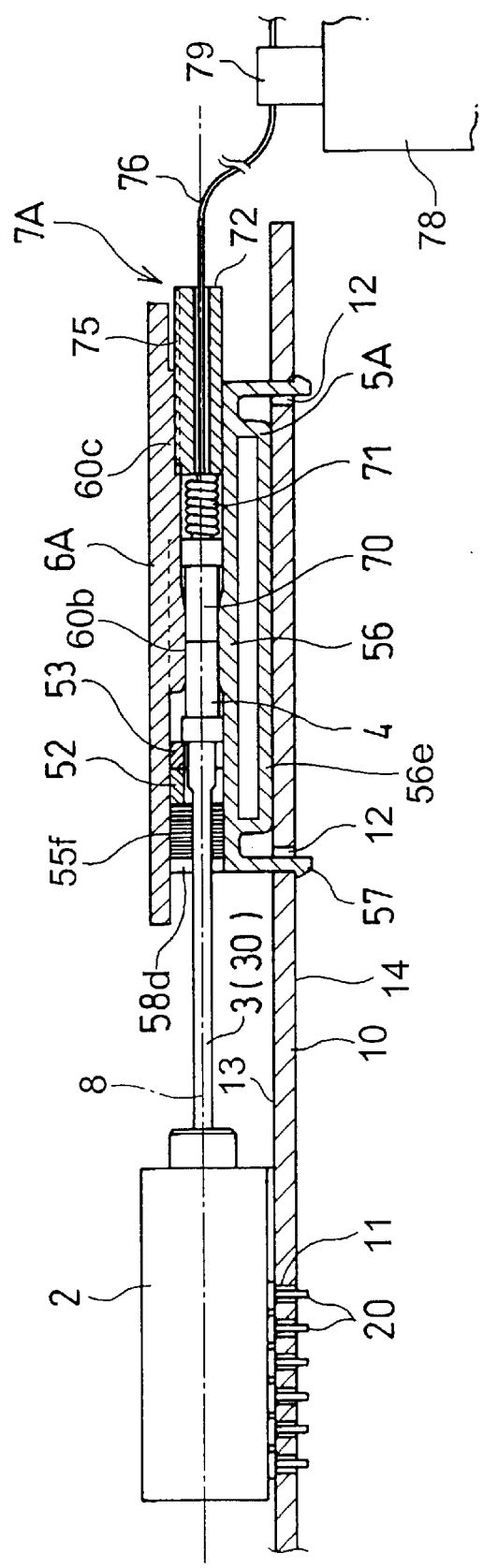
FIG. 5 is a sectional view showing an optical connector, an optical module product including an optical connector adapter accommodating another optical connector mated to the optical connector, and an optical module mounting substrate product.

A protrusion 60b (as shown in FIG. 5) is formed on the inner surface 60a of the cover portion 60. When the cover 6A covers the first opening portion 50, the optical connector 4 and the optical connector 7 is arranged between the protrusion 60b and the mounting surface 56a, whereby the optical connector 4 and the optical connector 7 are positioned with respect to the vertical direction to the mounting surface 56a.

The connector 7A will be described with reference to FIGS. 1, 2 and 3A. The optical connector 7A comprises a ferrule 70, a spring 71, and an insertion member 72. A coated optical fiber 76, the coating layer of which is removed at its end portion, is connected to the optical connector 7A. The ferrule 70 is available for an MT connector, and the filaments of the coated optical fiber 76 are arranged therein.

An elastic member, such as the spring 71, is adjacent to the ferrule 70. In the optical connector 7 shown in FIGS. 1 to 4, the coated optical fiber 76 passes through the spring 71. The insertion member 72 is arranged so as to be adjacent to the spring 71. The insertion member 72A has a through hole through which the coated optical fiber 76 passes. Thus, with the coated optical fiber 76 inserted in this hole, the insertion member 72 can move along the coated optical fiber 76.

The insertion member 72 includes a pair of arm portions 73. The arm portions 73 extend from the respective side surfaces of the insertion member 72 toward the ferrule 70. Each arm portion 73 includes an engagement portion 74 at its tip end. The engagement portion 74 is latched to the engagement portion 54 of the guide member 53. A protrusion 75 is arranged, on the upper surface of the insertion member 72, along the optical axis of the optical connector 7 so as to be inserted into the adapter 5A along the axis 8. A groove 60c (shown in FIG. 2) is provided on the lower surface 60a of the cover portion 60. The protrusion 75 enables the groove 60c to guide the optical connector 7A. It is also possible to apply a recess instead of the protrusion 75 and to apply a protrusion instead of the groove 60c.

With reference to FIGS. 1 to 5, a procedure of connecting the optical connector 7 to the optical module product 9A will be described.

The optical connector 4 connected to the optical module 2, the adapter 5A, the stopper 52, the guide member 53, and the cover 6A are combined in the following sequence. With reference to FIG. 1, the optical connector 4 is moved in a direction indicating Arrow B toward the adapter 5A to be arranged on the mounting surface 56a. The guide member 53 is moved in a direction indicating Arrow C to be arranged on the mounting surface 56a so as to adjoin the optical connector 4. Next, the stopper 52 is moved in a direction indicating Arrow C and then is arranged while the stopper 52 positioned to the adapter 5A. This arrangement restricts the moving range of the optical connector 4. Subsequently, the cover 6A is moved in a direction indicating Arrow D to be arranged so as to cover the optical connector 4. The cover 6A closes the first opening portion 50, whereby the covers 6A protects the optical connector 4, the stopper 52, and the guide member 53.

When the first opening portion 50 of the adapter 5A is closed by the cover 6A, the adapter 5A and the cover 6A defines the insertion direction of the optical connector 7A. That is, when the optical connector 7A is pushed in through the second opening portion 51, the optical connector 7A is guided by the bottom portion 56a, the pair of wall portions 55, and the cover portion 60. The optical connector 4 and the ferrule 70 are positioned to each other by the guide pins 40.

The optical connector 4 and the ferrule 70 are in contact with each other, and then the optical connector 7A is further pushed in such that the spring 71 is pressed. The engagement portion 54 of the guide member 53 is latched to the engagement portion 74 of the insertion member 72. The optical connector 4 and the optical connector 7 are held by an elastic returning force generated by the spring 71 with the engagement portions 54 and 74 latched to each other.

The stopper 52 restricts the range that the optical connector 4 in this connection, whereby an external force directly applied to the coated optical fiber 3 is decreased and the quality of the bend of the coated optical fiber 3 is also decreased. This prevents the coated optical fiber 3 from being damaged. In mating them, force is not directly applied to the optical module 2.

Even if spacing (gap less than a millimeter) is provided between the optical connector 4 and the guide member 53 or between the guide member 53 and the stopper 52, there is no obstacle in practical use in mating the optical connector 4 and the optical connector 7 with each other.

Figure 4:
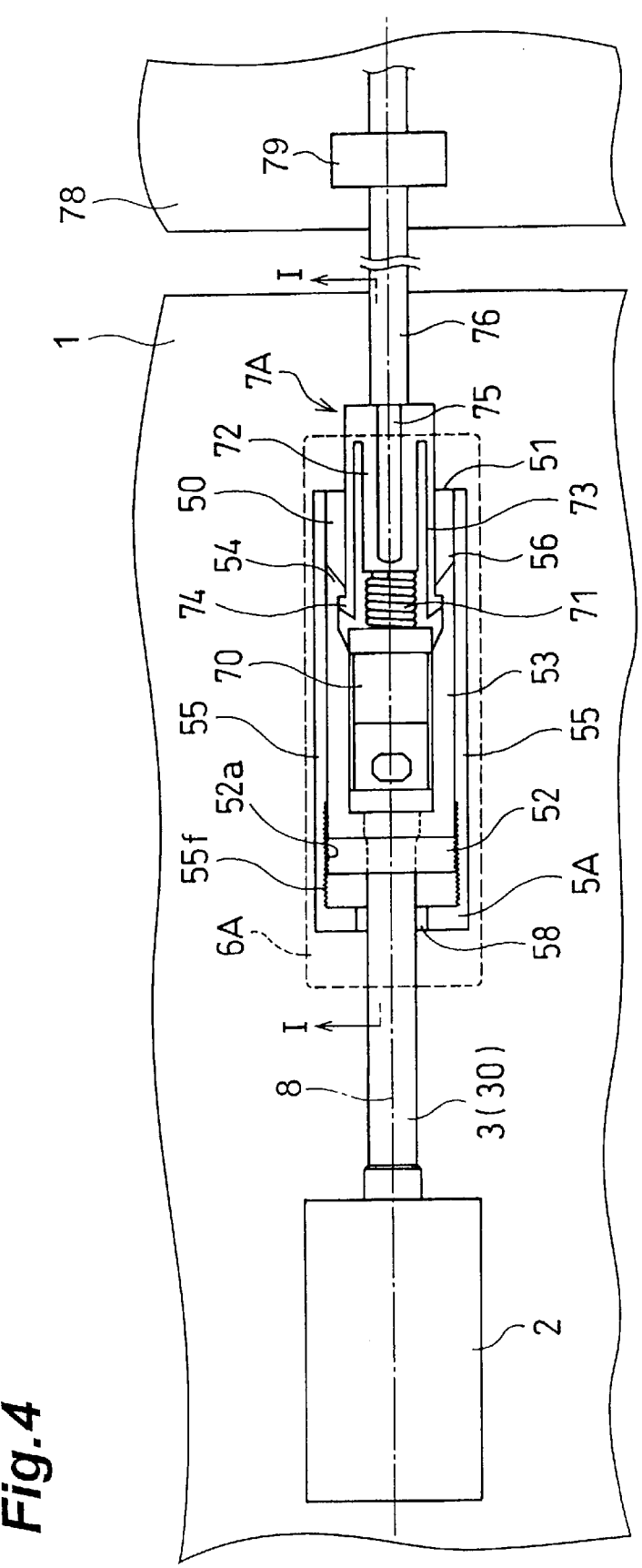
FIG. 4 is a plan view showing the optical module product to which the optical connector is connected.

FIGS. 4 and 5 show the optical connector 4 and the optical connector 7A accommodated in the adapter 5A. After the optical connector 7A is mated to the optical connector 4, the coated optical fiber 76, connected with the optical connector 7A, is stringed in securing portions 79 provided on a wiring base 78.

In order to attach the optical module 2 and other electronic parts to the substrate 10, reflow soldering can be used. The coated optical fiber 3 and the optical connector 4 both are not, however, heat-resistant. In the foregoing first embodiment, in order to protect them against heat in the reflow soldering step, the protecting layer such as the heat-shrinkable tubing 30 protects the coated optical fiber 3. The shielding member such as the lid portion 6A can also protect the optical connector 4 against heat.

According to the optical module mounting substrate product 1A and the optical module product 9A of the first embodiment, the coated optical fiber 3 is provided between the optical connector 4 and the optical module 2, whereby force from the optical connector 4 is not directly applied to the optical module 2 in mating the optical connector 7A and the optical connector 4 and unmating it therefrom. The optical module 2 can be, therefore, kept in excellent characteristics for a long term.

Since the adapter 5A is provided for holding the optical connector 4 therein, it is possible to mate the optical connector 7A to the optical connector 4 at a position apart from the optical module 2. That is, the adapter 5A can be arranged at a position appropriate for easily carrying out the mating operation, and the optical module 2 can be arranged at a position suitable for connecting it with other electronic parts. The optical module 2 has a structure allowing the optical connector 4 to couple the optical connector 7A through the coated optical fiber 3. This structure permits the prompt mating, and can reduce restrictions on the design of the printed circuit board.

In a receptacle type optical module of a structure different from the optical module product 9A and the optical module mounting substrate 10 of this embodiment, since the module body has a connector portion, it has been necessary for a region for mating an optical connector in the vicinity of the optical module. On this account, this region cannot mount other electronic parts thereon. However, in the present invention, such a region is not needed.

Both optical module 2 and adapter 5A are mounted on the substrate 10, and the optical connector 4 is held in the adapter 5A. This configuration can prevents the coated optical fiber 3 from being bent between the optical module 2 and the optical connector 4.

The adapter 5A has the first opening portion 50 and the second opening portion 51. Owing to these opening portions, the optical connector 4 can pass through the first opening portion 50, so that the optical connector 4 can is arranged in the adapter 5A without damaging the coated optical fiber 3, and the optical connector 7A can pass through the second opening portion 51 in connecting, so that the optical connector 7A can be mated with the optical connector 4.

The optical connector 4 is the push-on type optical connector, whereby the connection is easily made by inserting the optical connector 7 through the second opening portion 51.

The adapter 5A also has a stopper 52, which prevents the coated optical fiber 3 from being bent by a force applied in connecting the optical connector 7A. This is particularly advantageous for the push-on type optical connector of the optical connector 4.

The stopper 52 can suppress the so-called ferrule back phenomenon. When the ferrule back phenomenon occurs, the repelling force from the spring 71 moves the optical connector 4 in a direction along the coated optical fiber 3 while the optical connector 7A is mated to the optical connector 4. When the coated optical fiber 3 cannot alleviate, by its bending, the repelling force applied to the optical connector 4, this phenomenon affects the characteristics of the coated optical fiber 3.

There is a slight difference in the position of the optical connector 4 accommodated in the adapter 5A depending on the respective assembling accuracy between the coated optical fiber 3 and the optical connector 4 with respect to the optical module 2 and depending on the respective mounting accuracy with respect to the substrate 10. When the length of the coated optical fiber 3 is about 30 mm, the position of the optical connector is shifted by, for example, about 1 mm with respect to the optical axis direction. The position of the stopper 52 can be, however, adjusted, whereby the positional shifts can be compensated for by the adjusted position of the stopper 52. This is effective for reducing the occurrence of the ferrule back phenomenon in the optical connector 4.

The adapter 5A comprises the positioning portions 55e and 55f provided on the inside surfaces 55c and 55d of the wall portion 55 to adjust the attaching position of the stopper 52, whereby the positioning portions 55e and 55f provide the stopper 52 with easy positional adjustment and prevent the optical connector 4 from moving. The fineness in the positional adjustment depends on the pitch of the recesses or protrusions contained in the positioning portions 55e and 55f. This structure provides the positional adjustment with high precision less than a millimeter. The simple structure results in the high reliability.

The lid 6A can hold the optical connector 4 tightly in place, so that the coated optical fiber 3 is prevented from bending. The lid 6A covers the mated optical connector 4 to protect the optical connector 4 from dust and from contact with surrounding electric parts. Further, since the lid 6A can protect the optical connector 4 from heat added in manufacturing steps, it is useful for fabricating good-quality optical modules.

Since the coated optical fiber 3 is protected by the protecting layer such as the heat shrinkable tubing 30, this protecting layer prevents the coated optical fiber 3 from coming into direct contact with surrounding electric parts and protects the coated optical fiber 3 from heat in the reflow soldering step. Accordingly, it is possible to manufacture the high quality optical module product and optical module mounting substrate product. The coating layer can also raise the rigidity of the coated optical fiber 3.

The heat shrinkable tubing 30 can adhere to the side surface of the coated optical fiber 3 to form the protecting layer. Since the heat shrinkable tubing 30 is excellent in heat resistance, it is suitable for protecting the coated optical fiber 3 from heat added in the manufacturing steps. The heat shrinkable tubing 30 can cover not only the boot 41 for the optical connector 4 but also the connecting portion to the optical module 2 in order to provide the protecting layer. The coated optical fiber 3 is likely to bend at the portions above. This protecting layer is useful to suppress the bending of the coated optical fiber 3 threat.

Figure 6:
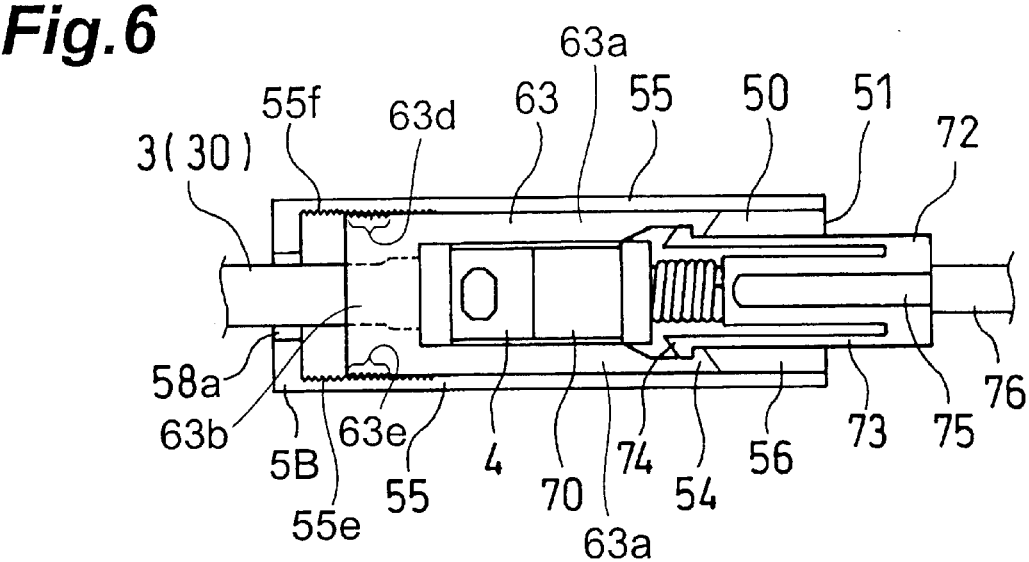
FIG. 6 is a plan view showing a modification of the optical connector adapter.
Figure 7:
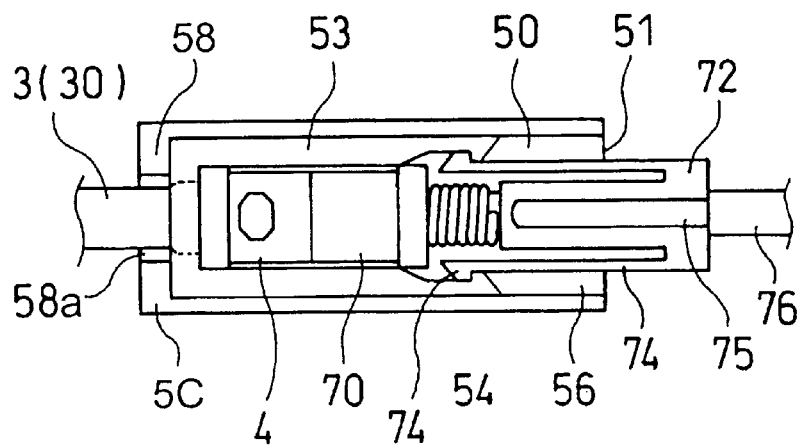
FIG. 7 is a plan view showing a modification of the optical connector adapter.
Figure 8:
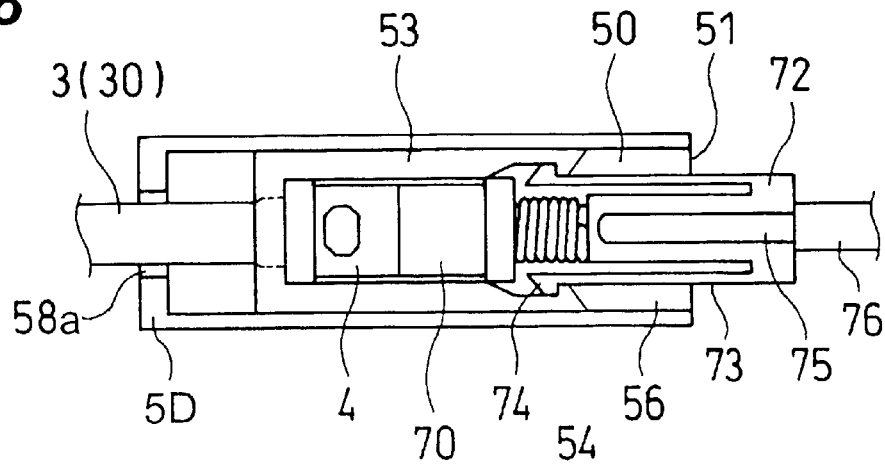
FIG. 8 is a plan view showing a modification of the optical connector adapter.

FIGS. 6 to 8 show various modifications of adapters applicable to the optical module product of the first embodiment. With respect to the adapters shown in these drawings, the configurations or forms already described above can be applied to the modifications below, and have the same function and effect in the modifications.

An adapter 5B shown in FIG. 6 comprises a guide member 63, formed integrally, which has function of both stopper 52 and guide member 53 in the first embodiment. Engagement portions 63d and 63e are provided on both side surfaces of a bridge portion 63b connecting both arm portions 63a of the guide member 63. The adapter 5B of FIG. 6 also provides the much same effect as the optical module product of the first embodiment.

In the adapter 5C shown in FIG. 7, the inner surface of the third wall portion 58 is used as a stopper. The adapter 5C shown in FIG. 7 can provide much the same effect as the optical module product of the first embodiment except that the position of the stopper (third wall portion 58) can not be adjusted. The adapter 5C has a simpler configuration than that of the optical module product as shown in FIG. 6 in that the adapter 5C does not have any portions, such as an additional part of the stopper as well as the positioning portions 55e and 55f provided in the adapter 5B shown in FIG. 6. However, the adapter 5C may have the positioning portions 55e and 55f. The adapter 5C can be relocated on the substrate, so that the optical connector 4 is also relocated with regard to the position of the optical module 2 on the substrate.

An adapter 5D shown in FIG. 8 does not include the stopper 52 as in the first embodiment. Besides, since the adapter 5D does not comprise the stopper, the positioning portions are also not provided on the inner surfaces of the pair of wall portions 55. The adapter 5D has a simple configuration in these points. In the adapter 5D, the optical connector 4 is secured to the guide member 53. The adapter 5D is suitable for a configuration that the coated optical fiber 3 has sufficient rigidity provided by the protecting layer such as the heat shrinkable tubing 30. This is because the heat shrinkable tubing 30 can provide the adapter 5D with rigidity sufficient to protect it against a force applied in the optical axis direction in mating the optical connector 7.

In the adapter 5D, a force can be applied to the optical module 2 in the optical axis direction when a push-on type optical connector is mated to the optical module 2. However, after the optical connector has been mated, the guide member 53, engaged with the insertion member 72, receives the force, whereby the force is not directly applied to the optical module 2. The coated optical fiber 3 can relieve other force, such as bending moment applied in the direction perpendicular to the top surface of the substrate 10 in mating or unmating the optical connector or bending moment caused by war page in the substrate 10, because of the protecting layer 30, whereby the force is not exerted on the optical module 2.

Although not particularly shown in the drawing, the guide member 53 may be formed integrally with the adapter.

Figure 9:
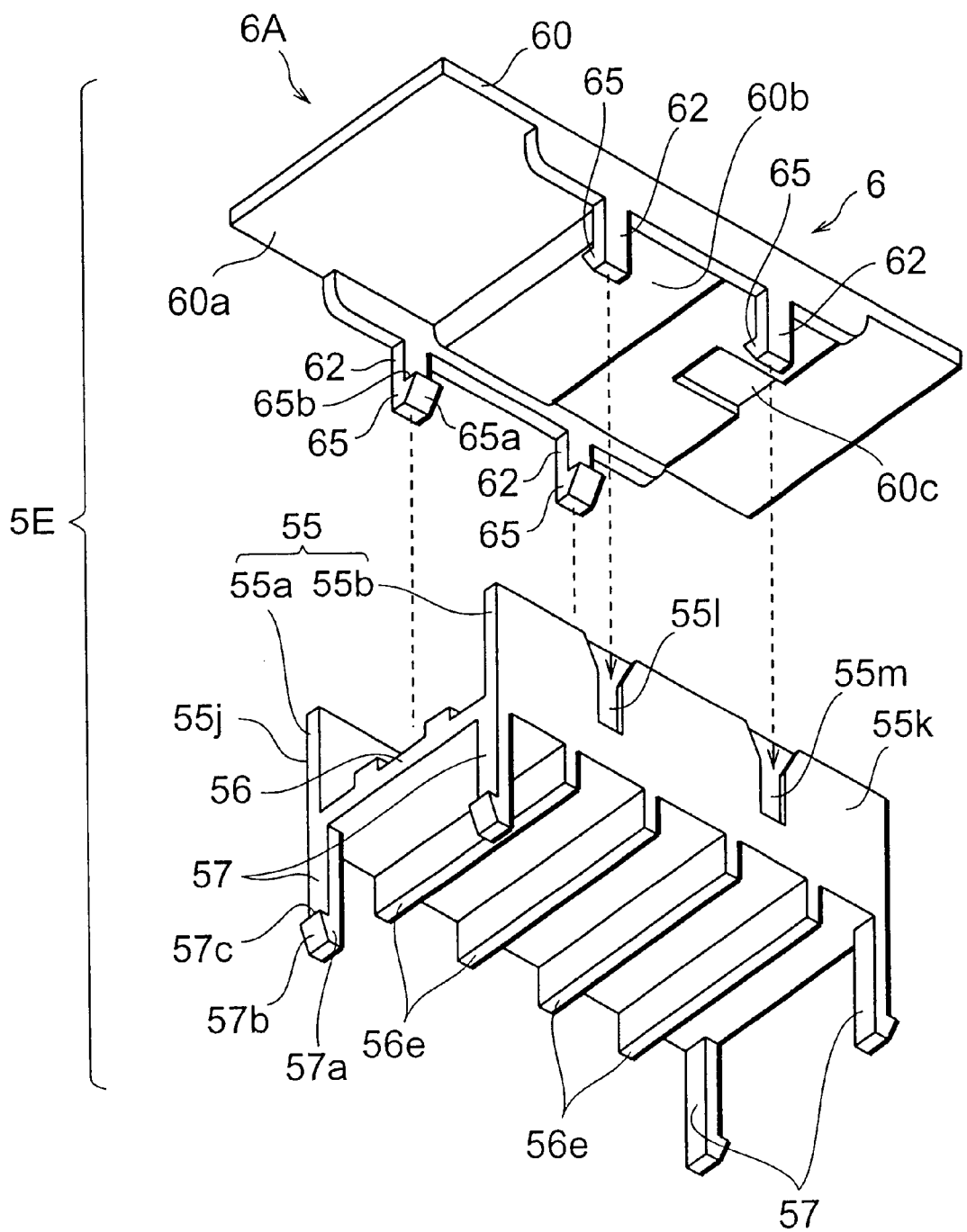
FIG. 9 is a plan view showing a modification of the optical connector adapter.

FIG. 9 is a view showing an adapter 5E. A pair of wall portions 55a and 55b comprises guide grooves 55l and 55m on outside surfaces 55j and 55k (although they are provided on the outside surface 55j, they do not appear in the drawing). The guide grooves 55l and 55m can guide leg portions 62 such that a lid 6 is arranged at a predetermined position. Each of the guide grooves 55l and 55m extends in a direction from one side of the outer wall surface 55k to a bottom portion 56. The guide grooves 55l and 55m also include fan grooves having the shape of a sector in the vicinity of one side of the outer surface 55k, and rectangular grooves adjoining the respective fan grooves. The fan grooves can easily guide the engagement portions 65 of the leg portions 62 to the guide grooves, whereby the lid 6A is attached to the predetermined position.

The adapter 5E is arranged on the substrate 10 (not shown), and the bottom portion 56 comprises one or more support portions 56e extending in a direction perpendicular to the bottom surface. The respective support portions 56e extend so as to provide a space between the substrate 10 and the bottom portion. The space provides a heat insulating layer, adjacent to the support portion 56e, by air.

Figure 10:
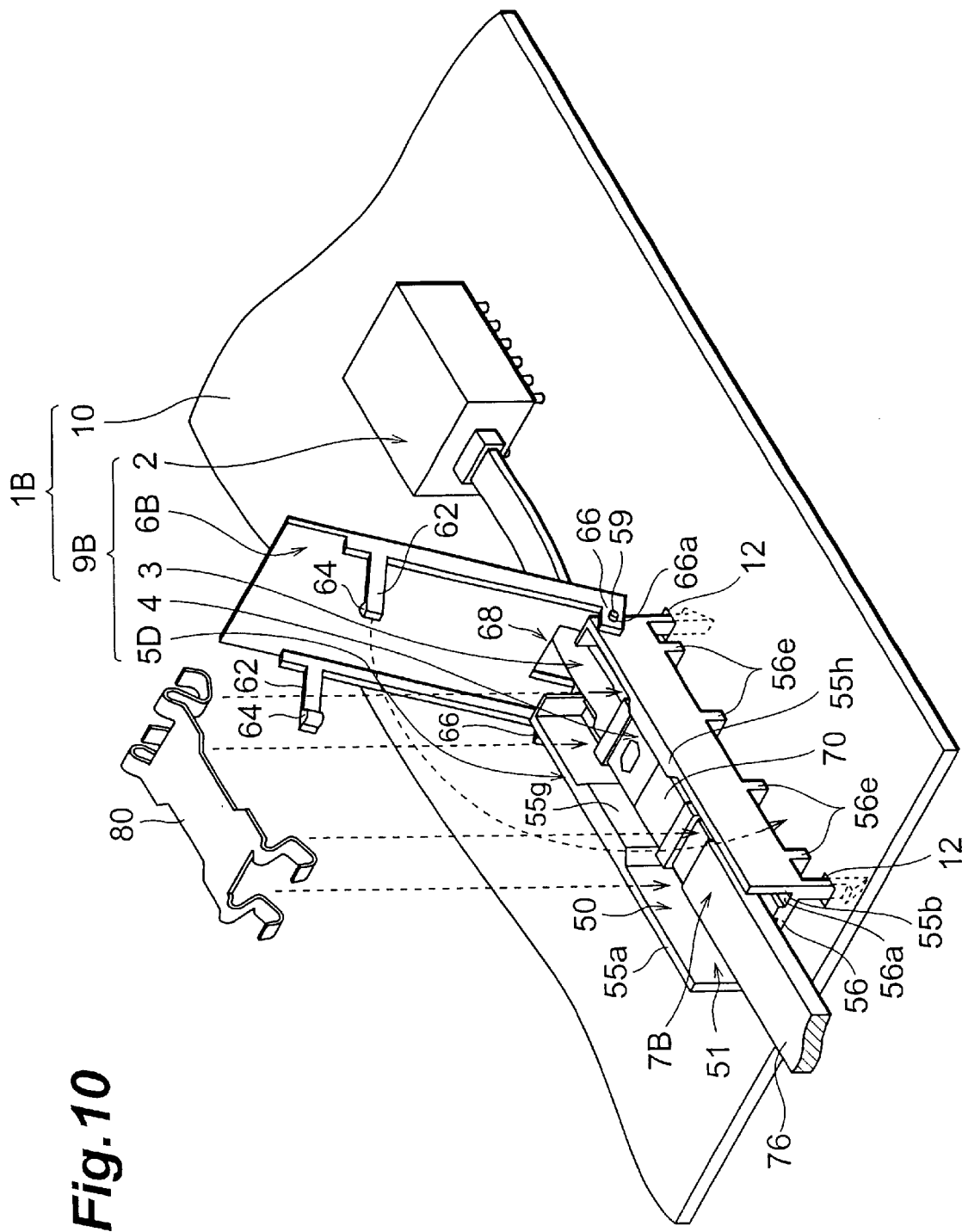
FIG. 10 is a perspective view showing an optical module product, an optical module mounting substrate product, and an optical connector according to a second embodiment of the present invention.

Next, with reference to FIGS. 10 to 12, an optical module product 9B and an optical module mounting substrate product 1B of a second embodiment will be described. The optical module product 9B of the second embodiment comprises an adapter 5D and a lid 6B different from the adapter 5A and the lid 6A described in the first embodiment, respectively. Besides, the second embodiment provides an optical connector 7B different from the optical connector 7A of the first embodiment.

As in the case of the first embodiment, the adapter 5D comprises a first opening portion 50 opened to a direction vertical to a mounting surface 55a and a second opening portion 51 opened in an optical axis direction of an optical connector 4 provided in the adapter 5D. Since the optical connector 4 shown in the second embodiment is not used as a push-on type connector, the adapter 5D does not include the stopper 52, the guide member 53 and the positioning portions 55e and 55f as shown in the stopper 5A of the first embodiment.

On the other hand, the adapter 5D has protrusions 55g and 55h on respective inner surfaces of a pair of wall portions 55a and 55b in order to position the optical connector 5 in both right and left directions with respect to the optical axis. Since the protrusions 55g and 55h are provided so as to guide the optical connectors 4 and 7B, an interval between the pair of protrusions 55g and 55h is determined to become an interval slightly larger than the widths of the optical connectors 4 and 7B.

In the adapter 5D, the bottom portion 56 has support portions 56e extending opposite to the wall portions 55a and 55b with respect to the mounting surface 56a. The supporting portions 56e are arranged between the substrate 10 and the bottom portion 56, and has a plurality of supporting plates extending in a direction intersecting with the longitudinal direction of the adapter 5D. The supporting portions 56e have predetermined height so as to provide an air gap between the substrate 10 and the bottom portion 56. This air gap is provided so as to decrease heat conduction from the substrate 10.

The adapter 5D has a projection 59 provided on each of the outside surfaces of the wall portions 55a and 55b. A pair of hinge pieces 66 are provided at one end of the lid 6B. Each hinge piece 66 has a hinge hole 66a provided such that the protrusion 59 of the adapter 59 is inserted therein. When the hinge holes 66a of the lid 6B are engaged with the projections 59 of the adapter 5D, the lid 6B becomes rotatable about an axis connecting the pair of projections 59. This configuration shows that the lid 6B is attached to the body of the adapter 5D so as to open and close the first opening portion 50.

In the adapter 5D, the lid 6B covering the first opening portion 50 has such a size that it can cover the whole adapter 5D. The lid 6B has a pair of leg portions 62 extending from both side edges. An engagement portion 64 is arranged at each tip end of the leg portions 62. When the lid 6B is disposed so as to cover the first opening portion 50, the engagement portions 64 are latched detachably to the bottom portion 56 of the adapter 5D, remaining the latching state in which the lid 6B covers the first opening portion 50.

The lid 6B has a rectangular cut 68 provided between the pair of hinge pieces 66. The cut 68 allows the lid 6B to sufficiently open even when the optical connector 4 is arranged in the adapter 5D.

The optical connector 7 of the second embodiment can be an MT connector. The MT connector has a ferrule 70 attached to a tip portion of a coated optical fiber 76. After the optical connector 4 and the optical connector 7B are mated with each other, an optical connector clip 80 is used to keep the optical connector 4 and the optical connector 7B mated. The optical connector clip 80 is attached and detached by use of an optical connector clip tool 82 as shown in FIG. 11.

A procedure of connecting the optical connector 7B to the optical module product 9B will be described.

Figure 11:
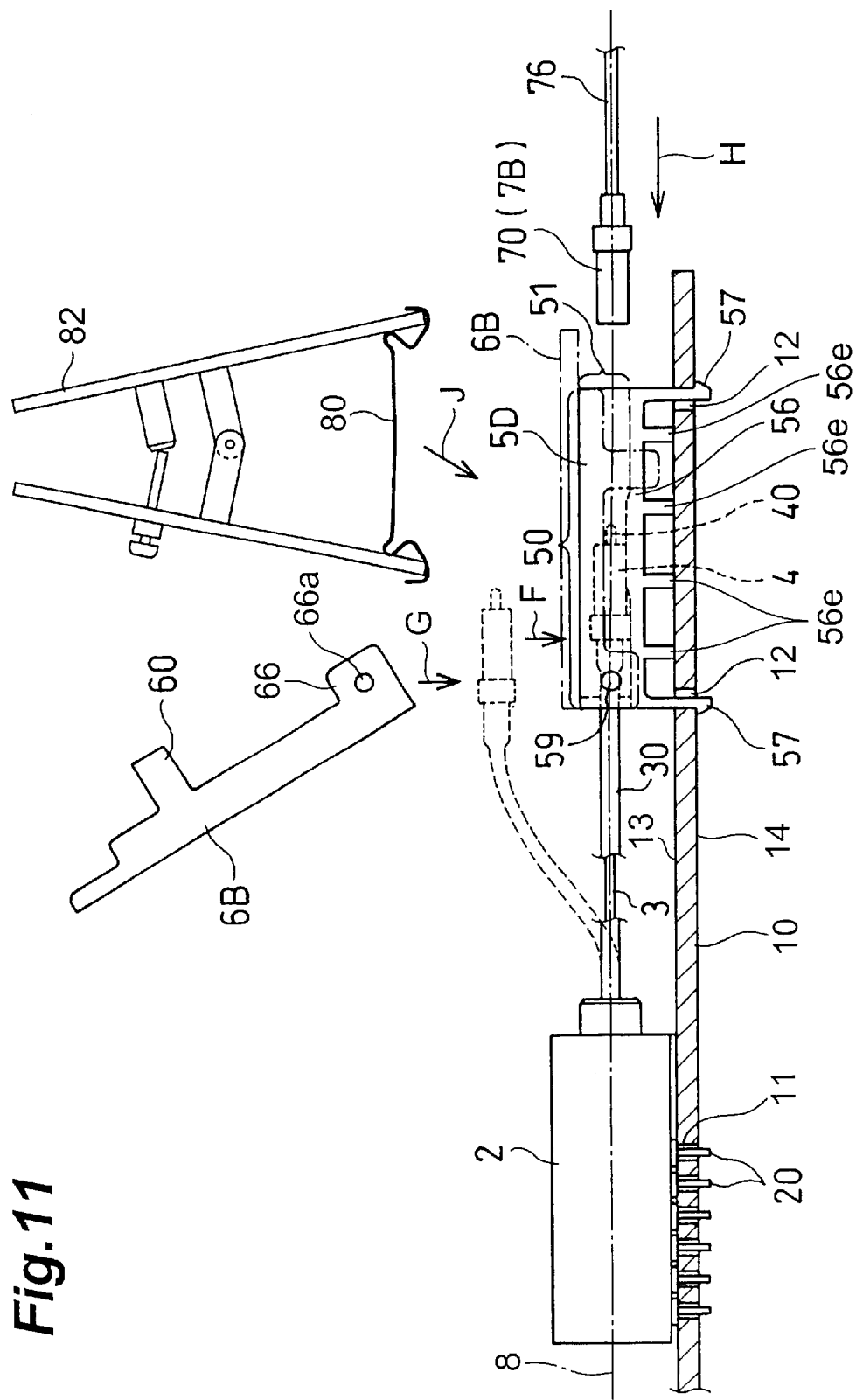
FIG. 11 is a side view showing the optical module product, the optical module mounting substrate product, and the optical connector according to this embodiment.
Figure 12:
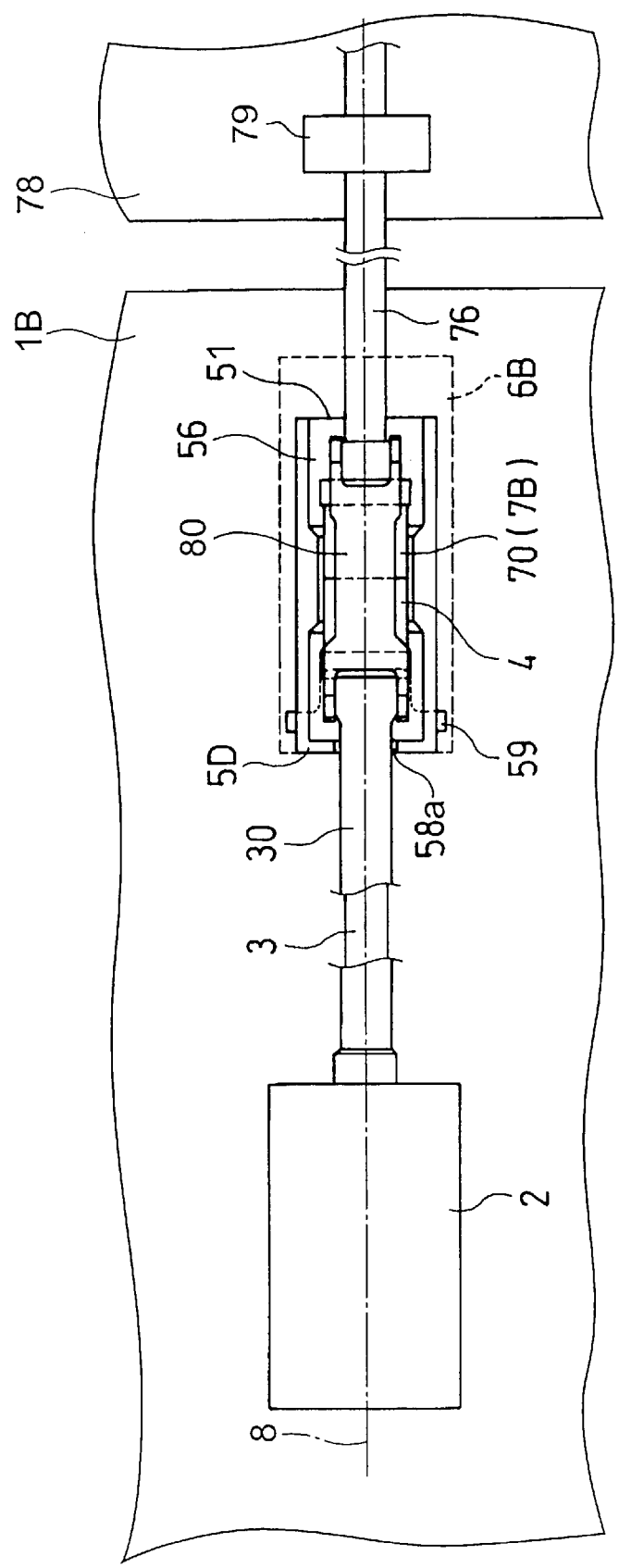
FIG. 12 is a plan view showing the optical module product to which the optical connector is connected.

In accordance with a direction of Arrow F shown in FIG. 11, the optical connector 4 is placed on the mounting surface 56 through the first opening portion 50. In accordance with a direction of Arrow G, the protrusion 59 is inserted in the hinge hole 66a such that the lid 6B is attached to the adapter 5D. Next, in accordance with Arrow H, the optical connector 7B is inserted through the second opening portion 51, so that the mating surface of the optical connector 4 faces the mating surface of the optical connector 7B. Thereafter, in accordance with a direction of Arrow J, the optical connector 4 and the optical connector 7B is clamped by the optical connector clip 80 using the tool 82 with the first opening portion 50 opened. Then, the lid 6B is closed as shown in FIG. 12.

Even if the lid 6B is opened or closed, the operation can be made such that the mating surface of the optical connector 4 faces the mating surface of the optical connector 7B. The operation can be performed while making visual observations. Since the optical connector clip 80 has to be attached in a subsequent step, in most cases, the connectors 4 and 7B is mated while the lid 6B is opened.

The optical module product 9B shown in the second embodiment also has effects similar to those of the optical module product 9A according to the first embodiment except for effects relating to a point that the optical connector 4 is not used as a push-on type optical connector.

The optical module product of the present invention is not limited to the foregoing embodiments. For example, in the foregoing embodiments, although the substrate 10 is a printed wiring board in which wiring is printed, it can be a plate-like member for only mounting the optical module 2 and the adapters 5A to 5D. Besides, in the foregoing embodiments, although the first opening portion 50 continuously connects the second opening portion 51, these opening portions 50 and 51 can be provided such that they are separated from each other. Further, in the foregoing embodiments, although the lid 6A or 6B can be attached to the adapters 5A to 5D, it can be directly attached to the substrate 10 so as to cover the first opening portion 50.

In the first embodiment, although the description has been made on the push-on type optical connector wherein the optical connector 7A contains the spring, the optical connector 4 may contain the spring, or both may incorporate the spring. In the first embodiment, although the MT connector is used to form the push-on type optical connector, the push-on type optical connector can also be made using an MPO type connector.

A pigtail type optical module includes a coated optical fiber of several tens cm or more extended from an optical module in which an optical connector is attached to the tip end of the coated optical fiber. Since the coated optical fiber has a sufficient margin of the length of the pigtail type optical module, the ferrule back phenomenon does not exert force on the optical module and the coated optical fiber to cause a change in characteristics in mating the optical connectors. However, the pigtail type optical module requires a region on the substrate where the coated optical fiber is arranged with the coated optical fiber tied in a bundle. At this point, it is different from the optical module product of the present invention, which is advantageous for connecting the optical connector on the substrate while the area for the optical fiber is saved.

In the pigtail type optical module like this, it is difficult to handle the coated optical fiber in an assembling step for an optical module as well as a part-mounting step therefor, it is also difficult to apply assembling automatization and a reflow soldering step. However, the present invention can improve the defects of this sort of pigtail type optical modules.

Figure 13:
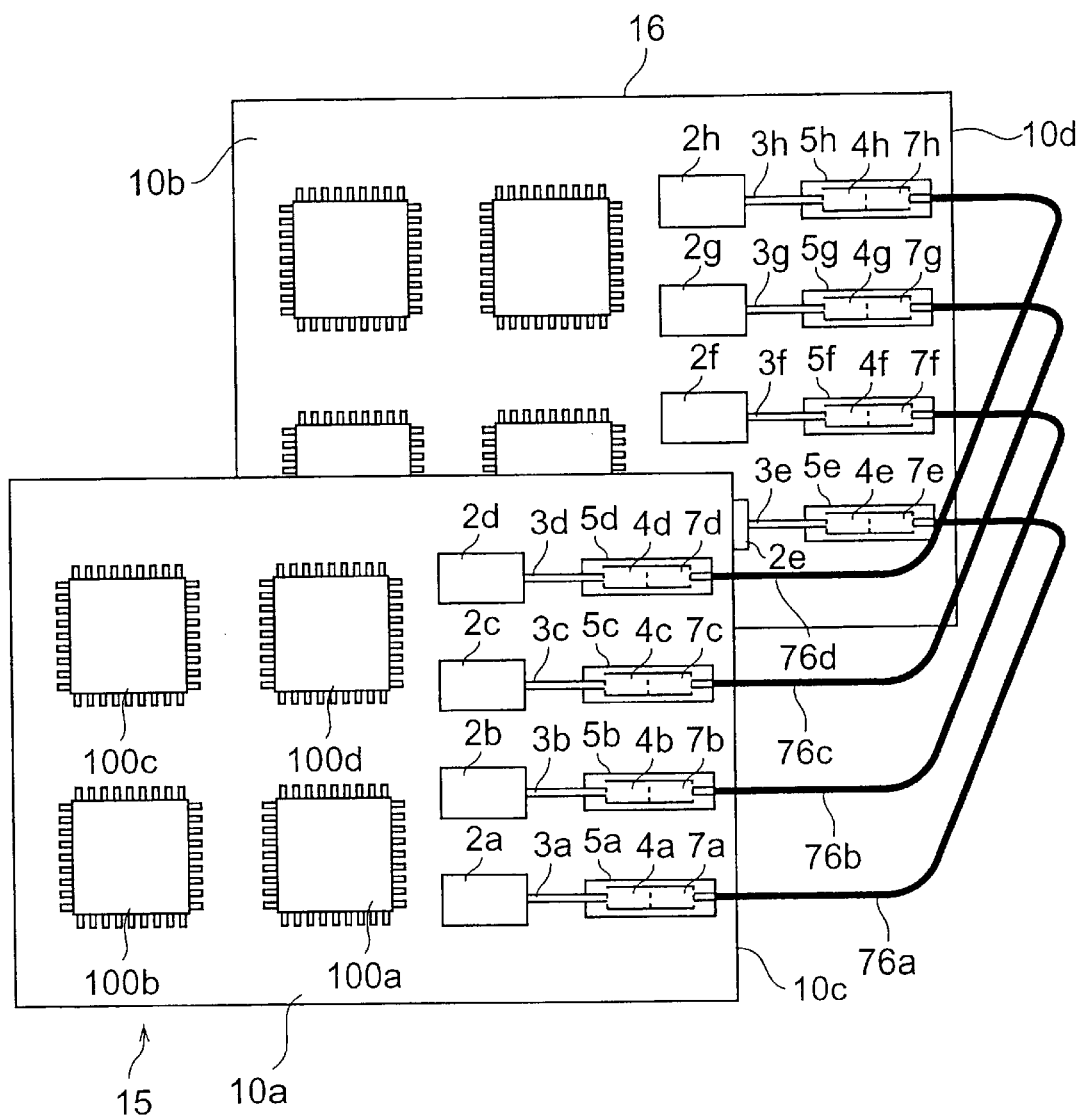
FIG. 13 is a schematic view showing an optical module mounting substrate product according to a third embodiment of the present invention.

FIG. 13 is a schematic view showing a pair of optical module mounting substrate products of a third embodiment.

An optical module mounting substrate product 15 (16) comprises optical modules 2a, 2b, 2c and 2d (2e, 2f, 2g and 2h), adapters 5a, 5b, 5c and 5d (5e, 5f, 5g and 5h), optical connectors 4a, 4b, 4c and 4d (4e, 4f, 4g and 4h), coated optical fibers 3a, 3b, 3c and 3d (3e, 3f, 3g and 3h) for connecting the optical connectors 4a, 4b, 4c and 4d (4e, 4f, 4g and 4h) to the optical modules 2a, 2b, 2c and 2d (2e, 2f, 2g and 2h), respectively, and a substrate 10a such as a printed circuit substrate. The optical connectors 4a, 4b, 4c and 4d (4e, 4f, 4g and 4h) are respectively connected to optical connectors 7a, 7b, 7c and 7d (7e, 7f, 7g and 7h). The optical connectors 7a, 7b, 7c and 7d are respectively connected to the optical connectors 7e, 7f, 7g and 7h through coated optical fibers 76a, 76b, 76c and 76d. One or more electronic parts 100a to 100d can be mounted on the optical module mounting substrate product 15.

As described above, since the optical module mounting substrate product 15 and the optical module mounting substrate product 16 have the same structure, the following description will be made on the optical module mounting substrate product 15.

The optical modules 2a to 2d are arranged so that one surface of each of the optical modules 2a to 2d faces one side 10c of the substrate, 10a, and the coated optical fibers 3a to 3d extend from the surface of each optical modules 2a to 2d. The adapters 5a to 5d are arranged between the optical modules 10a to 10d and the one side 10c. The adapters 5a to 5d accommodates the optical connectors 4a to 4d connected to one end of the coated optical fibers 3a to 3d, with the optical axes of the optical connectors 4a to 4d directed to the one side 10c of the substrate 10a.

In the optical module mounting substrate product 15, the optical connectors 4a to 4d and the other optical connectors 7a to 7d can be mated to each other on the side 10c of the substrate 10a. When the optical connectors 4a to 4d are mated to the optical connectors 7a to 7d in the adapters 5a to 5d, the connecting portions of the connectors can be protected. The adapters 5a to 5d can also be disposed so that the other optical connectors 7a to 7d are mated at respective positions where the optical connectors 7a to 7d protrude from the one side 10c of the substrate 10a in part. In this arrangement, even if a lid is provided so as to cover the substrate 10a, the adapters 5a to 5d can be arranged so as to protrude from the one side of the substrate 10a. This arrangement facilitates the attachment of the connectors 7a to 7d.

In the optical module mounting substrate product shown in FIG. 13, when the optical connectors 7a to 7d are mated to the optical connectors 4a to 4d, there is little force directly applied to the optical modules 2a to 2d. On the other hand, the pigtail type optical module requires a processing for tying the coated optical fiber together, connecting the optical connector and the optical module, in order to mount the tied coated optical fiber on the substrate 10a, and requires a region on the substrate where the bent coated optical fiber is disposed. The diameter of the bent coated optical fiber is about 40 mm. However, the optical module mounting substrate product 15 eliminates both this processing and the region. The distances between the optical modules 2a to 2d and the adapters 5a to 5d to can be less than 40 mm. In this embodiment, the distance is set to 30 mm. When the optical connectors 4a to 4d are disposed in the adapters 5a to 5d in view of allowable curvature of the coated optical fibers 3a to 3d, the minimum value of this interval can be estimated to be 10 mm.

Since the foregoing processing becomes unnecessary, it is possible to arrange the plurality of optical modules 2a to 2d along the one side 10c of the substrate 10a in a line. Besides, the arrangement density of the optical modules 2a to 2d can be enhanced without limitation by the above region. Since the adapters 5a to 5d comprise the second opening portions 51, the mating of the optical connectors 7a to 7d can be easily made even if a number of optical modules are arranged to be adjacent to each other.

In this embodiment, one side 10c of the substrate 10a has the effective size of 280 mm, and the width of the optical module has the effective size of 16 mm. Owing to the sizes, 16 optical modules can be disposed in parallel with the one side 10c of the substrate 10a. Accordingly, it is possible to secure 8 channels for each of transmission and reception, each having a transmission capacity of 2.4 Gbit per channel, and if the optical modules are mounted on the substrate with one side of 300 mm at high density, a transmission capacity of 160 Gbit can be secured. This value, however, depend on a transmission capacity per channel.

INDUSTRIAL APPLICABILITY

As described above, the adapter of the present invention includes the wall portions on the mounting surface. In the adapter, the first optical connector can be moved in the direction vertical to the mounting surface, and the second optical connector can be moved along the predetermined axis. On this account, the second connector can be inserted along the predetermined axis toward the housed first optical connector. Since the second optical connector is mated to and unmated from the first optical connector in this adapter, force applied to the optical module is decreased in mating and unmating the connector.

The optical module product of the present invention may be provided with the adapter, the coated optical fiber and the optical connector. The optical connector is housed in the adapter. Accordingly, the adapter can hold the optical connector attached to one end of the coated optical fiber extending from the optical module. This can decrease magnitudes of various forces such as a bending force to the coated optical fiber.

The optical module mounting substrate product of the present invention is provided with one or more optical module products and the substrate. The optical module and the adapter are attached onto the substrate. Since the second optical connector is mated to and unmated from the first optical connector housed in the adapter, even if the optical module is connected to one end of the first connector, the adapter prevents force, applied to the optical module, from being directly applied to the optical module in mating and unmating. This arrangement can prevent characteristics of the optical module from changing by the force, and enables the optical module to keep excellent characteristics for a long term.

Accordingly, there are provided the adapter in which force applied to the optical module can be decreased when the coated optical fiber is detached and attached, the optical module product including the connector, and the optical module mounting substrate on which the optical module product is mounted.

What is claimed is:

1. An adapter for connecting a first optical connector to a second optical connector, the first optical connector and the second optical connector being aligned with each other by means of a plurality of guiding pins, each optical connector including an optical fiber, comprising:
   a bottom portion having a mounting surface for mounting first and second optical connectors, said mounting surface extending in a direction of an optical axis of the optical fiber; and
   first and second wall portions provided on the mounting surface, the first and second wall portions having their respective inner wall surfaces faced to each other, the inner wall surfaces extending in a direction of the optical axis to guide at least one of the first and second optical connectors between the inner wall surfaces, and the first and second wall portions extending in the direction of the optical axis;

wherein the bottom portion and the first and second wall portions are arranged to provide a first opening portion and a second opening portion, the first opening portion being provided so as to receive the first optical connector, the first opening portion opening in a direction normal to the mounting surface, the second opening portion being provided so as to receive the second optical connector, and the second opening and the second opening portion opening in the direction of the optical axis.

2. The adapter according to claim 1, further comprising a stopper for restricting a position of a guide member of the first optical connector in the direction of the optical axis.

3. The adapter according to claim 2, further comprising positioning means for adjusting a position of the stopper in the direction of the optical axis.

4. The adapter according to claim 2, further comprising at least one of a recess and a protrusion, provided on each of the inner wall surfaces of the first and the second wall portions, for enabling a position of the stopper to be adjusted in the direction of the optical axis.

5. The adapter according to claim 1 further comprising a third wall portion extending in a direction intersecting with the optical axis, said third wall portion being connected with the first and second wall portions and the bottom portion;
   wherein the third wall portion includes a cut provided for receiving an optical fiber connected to one of the first and second connectors.

6. The adapter according to claim 1, further comprising a lid supported by the first and the second wall portions, said lid being provided so as to face the mounting surface.

7. The adapter according to claim 1, wherein the bottom portion has a latch portion and an opposed surface, the opposed surface being opposed to the mounting surface, the latch portion extending from the opposed surface in a direction normal to the opposed surface.

8. An optical module product comprising:
   said adapter according to claim 1;
   an optical module for performing at least one of a conversion of a conversion from an electrical signal into an optical signal and a conversion from an optical signal into an electrical signal;
   a coated optical fiber including a first end portion connected to the optical module and a second end portion; and
   an optical connector accommodated in the adapter, said optical connector being connected to the second end portion of the coated optical fiber, said optical connector having a plurality of holes for receiving guiding pins.

9. An optical module product comprising:
   said adapter according to claim 2;
   an optical module for performing at least one of a conversion from electrical signals into optical signals and a conversion from optical signals into electrical signals;
   a coated optical fiber including a first end portion connected to the optical module and a second end portion; and
   an optical connector, accommodated in the adapter, connected to the second end portion of the coated optical fiber, said optical connector having a plurality of holes for receiving guiding pins.

10. An optical module product comprising:
    said adapter according to claim 3;
    an optical module for performing at least one conversion of a conversion from electrical signals into optical signals and a conversion from optical signals into electrical signals;

a coated optical fiber including a first end portion connected to the optical module and a second end portion; and an optical connector, accommodated in the adapter, said optical connector being connected to the second end portion of the coated optical fiber, said optical connector having a plurality of holes for receiving guiding pins.

11. An optical module product comprising:

said adapter according to claim 4;

an optical module for performing at least one conversion of a conversion from electrical signals into optical signals and a conversion from optical signals into electrical signals;

a coated optical fiber including a first end portion connected to the optical module and a second end portion; and an optical connector accommodated in the adapter, an optical connector being connected to the second end portion of the coated optical fiber, said optical connector having a plurality of holes for receiving guiding pins.

12. An optical module product comprising:

said adapter according to claim 5;

an optical module for performing at least one conversion of a conversion from electrical signals into optical signals and a conversion from optical signals into electrical signals;

a coated optical fiber including a first end portion connected to the optical module and a second end portion; and an optical connector accommodated in the adapter, said optical connector being connected to the second end portion of the coated optical fiber, said optical connector having a plurality of holes for receiving guiding pins.

13. An optical module product comprising:

said adapter according to claim 6;

an optical module for performing at least one conversion of a conversion from electrical signals into optical signals and a conversion from optical signals into electrical signals;

a coated optical fiber including a first end portion connected to the optical module and a second end portion; and an optical connector accommodated in the adapter said optical connector being connected to the second end portion of the coated optical fiber, said optical connector having a plurality of holes for receiving guiding pins.

14. The optical module product according to claim 9, wherein the coated optical fiber has a protecting layer thereon.

15. The optical module product according to claim 14, wherein the protecting layer includes a heat shrinkable tubing adhered to a side surface of the coated optical fiber.

16. An optical module mounting substrate product comprising:

one or more optical module products each including an optical module, a coated optical fiber, an optical connector and an adapter for connecting another connector to the optical connector; the optical connector and the other optical connector being aligned with each other by means of a plurality of guiding pins; and a substrate including a conductive wiring layer, the optical module and the adapter being mounted to said substrate;

wherein the coated optical fiber includes a first end portion connected to the optical module and a second end portion connected to the optical connector;

wherein the adapter includes first and second wall portions and a bottom portion having a mounting surface, said mounting surface extending in a direction of an optical axis of the second end portion of the optical fiber, the mounting surface being provided for mounting thereon the optical connector, the first and second wall portions being arranged on the mounting surface at opposite two sides of the bottom portion, the first and second wall portions extending a direction of the optical axis; the first and second wall portions having their respective inner wall surfaces, and the inner wall surfaces extending in a direction of the optical axis to guide at least one of the optical connector and the other optical connector between the inner wall surfaces;

the bottom portion and the first and second wall portions are arranged to provide a fist opening portion and a second opening portion, said first opening portion being provided so as to receive the first optical connector, said first opening portion opening in a direction normal to the mounting surface, said second opening portion being provided so as to receive the other optical connector, and said second opening portion opening in a predetermined axis direction; and wherein the optical connector is accommodated in the adapter.

17. The optical module mounting substrate product according to claim 16, wherein an interval between the optical module and the adapter is not less than 10 mm and not larger than 40 mm.

18. The optical module mounting substrate product according to claim 16, wherein the optical module, the optical connector, the coated optical fiber, the adapter are arranged in a direction of an optical axis of the optical module product.

19. The optical module mounting substrate product according to claim 16, wherein the number of the optical module products, each arranged along one side of the substrate, is sixteen.

* * * * *